US012621729B2

(12) United States Patent
Wu et al.

(10) Patent No.: US 12,621,729 B2
(45) Date of Patent: May 5, 2026

(54) METHOD AND APPARATUS FOR HANDOVER AND REESTABLISHMENT IN A WIRELESS COMMUNICATION SYSTEM

(71) Applicant: LENOVO (BEIJING) LIMITED, Beijing (CN)

(72) Inventors: Lianhai Wu, Beijing (CN); Jing Han, Beijing (CN); Ran Yue, Beijing (CN); Jie Shi, Beijing (CN); Min Xu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 342 days.

(21) Appl. No.: 18/263,225

(22) PCT Filed: Jan. 27, 2021

(86) PCT No.: PCT/CN2021/073930
§ 371 (c)(1),
(2) Date: Jul. 27, 2023

(87) PCT Pub. No.: WO2022/160117
PCT Pub. Date: Aug. 4, 2022

(65) Prior Publication Data
US 2024/0121677 A1      Apr. 11, 2024

(51) Int. Cl.
| | |
|---|---|
| *H04W 36/00* | (2009.01) |
| *H04W 36/36* | (2009.01) |
| *H04W 40/22* | (2009.01) |

(52) U.S. Cl.
CPC ....... *H04W 36/0079* (2018.08); *H04W 36/36* (2013.01); *H04W 40/22* (2013.01); *H04W 36/0055* (2013.01)

(58) Field of Classification Search
CPC . H04W 36/0079; H04W 36/36; H04W 40/22; H04W 36/0055; H04W 88/04
See application file for complete search history.

(56) References Cited

U.S. PATENT DOCUMENTS

| | | | |
|---|---|---|---|
| 2018/0070264 A1* | 3/2018 | Saiwai | H04W 72/04 |
| 2020/0221532 A1* | 7/2020 | Jung | H04W 48/20 |

(Continued)

FOREIGN PATENT DOCUMENTS

| | | |
|---|---|---|
| EP | 3761751 A1 | 1/2021 |
| WO | 2017014716 A1 | 1/2017 |

OTHER PUBLICATIONS

International Search Report and Written Opinion dated Oct. 25, 2021 for International Application No. PCT/CN2021/073930.

*Primary Examiner* — Hashim S Bhatti
(74) *Attorney, Agent, or Firm* — AMPACC Law Group, PLLC

(57) ABSTRACT

Embodiments of the present disclosure relate to methods and apparatuses for handover and reestablishment in a wireless communication system. According to some embodiments of the disclosure, a method may include: receiving, at a user equipment (UE), a radio resource control (RRC) reconfiguration message including a path switch indication and a list of candidate relays; selecting a target relay from the list of candidate relays; and establishing a PC5 RRC connection with the target relay. Furthermore, the UE may select another target relay for path switch if a path switch failure associated with the first selected target relay happens.

17 Claims, 9 Drawing Sheets

(56)        References Cited

U.S. PATENT DOCUMENTS

2024/0214848 A1* 6/2024 Kang .................... H04W 40/22
2024/0414623 A1* 12/2024 Yao ....................... H04W 40/22

* cited by examiner

200

202

201B

201A

300

400

402

401C

401B

401A

700 receiving an RRC reconfiguration message including a path switch indication and a list of candidate relays, wherein the list of candidate relays includes one or more candidate relays — 711 selecting a target relay from the list of candidate relays — 713 transmitting an RRC reconfiguration sidelink message to the target relay — 715

800

| initiating a reestablishment procedure in response to a failure at a UE | 811 |

| selecting a target node from a plurality of candidate nodes for reestablishment | 813 |

METHOD AND APPARATUS FOR HANDOVER AND REESTABLISHMENT IN A WIRELESS COMMUNICATION SYSTEM

CROSS REFERENCE TO RELATED APPLICATIONS

This application is a national phase entry of International Application No. PCT/CN2021/073930 filed Jan. 27, 2021, which is incorporated by reference in its entirety.

TECHNICAL FIELD

Embodiments of the present disclosure generally relate to wireless communication technology, especially to a method, apparatus, and system for handover and reestablishment in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In the above wireless communication systems, a user equipment (UE) may communicate with another UE via a data path supported by an operator's network, e.g., a cellular or a Wi-Fi network infrastructure. The data path supported by the operator's network may include a base station (BS) and multiple gateways.

Some wireless communication systems may support sidelink communications, in which devices (e.g., UEs) that are relatively close to each other may communicate with one another directly via a SL, rather than being linked through the BS. A relaying function based on a sidelink may be supported in a communication network. For example, a UE supporting sidelink communication may function as a relay node to extend the coverage of a BS. An out-of-coverage UE may communicate with a BS via a relay UE. In the context of the present disclosure, a UE, which functions as a relay between another UE and a BS, may be referred to a UE-to-network relay or a U2N relay.

There is a need for efficiently performing communication in a communication system supporting a U2N relay.

SUMMARY

Some embodiments of the present disclosure provide a method. According to some embodiments of the present disclosure, the method may include: receiving, at a user equipment (UE), a radio resource control (RRC) reconfiguration message including a path switch indication and a list of candidate relays, wherein the list of candidate relays includes one or more candidate relays; selecting a target relay from the list of candidate relays; and transmitting an RRC reconfiguration sidelink message to the target relay.

Some embodiments of the present disclosure provide a method. According to some embodiments of the present disclosure, the method may include: initiating, at a user equipment (UE), a reestablishment procedure in response to a handover failure or a radio link failure; and selecting a target node from a plurality of candidate nodes for reestablishment, wherein the target node is either a candidate cell or a candidate relay.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions for handover and reestablishment and can facilitate and improve the implementation of various communication technologies such as 5G NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced.

It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
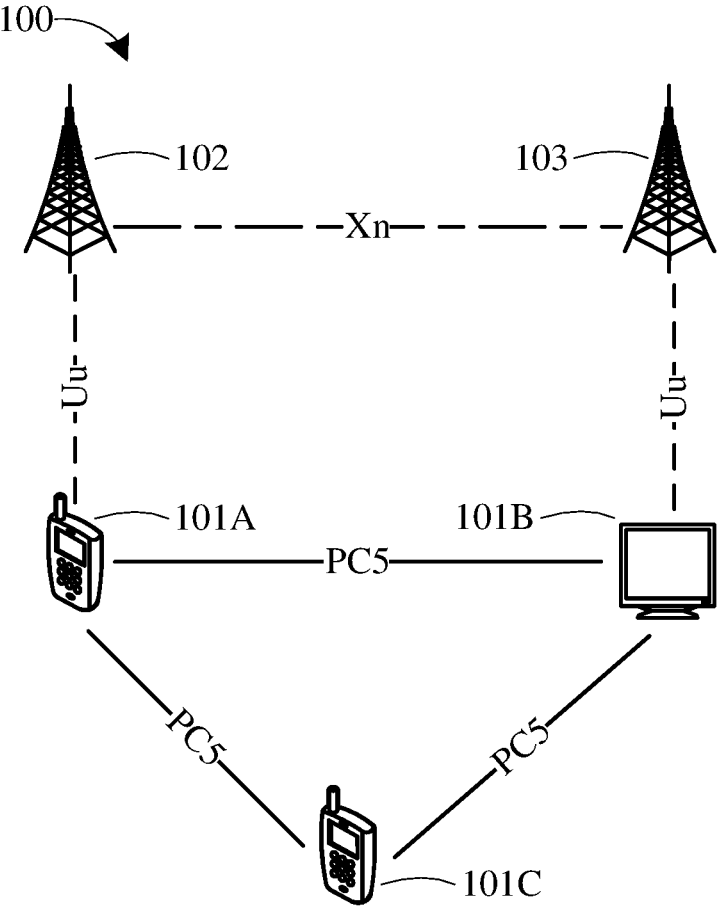
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, the wireless communication system 100 may support sidelink communications. Sidelink communication supports UE-to-UE direct communication. In the context of the present disclosure, sidelink communications may be categorized according to the wireless communication technologies adopted. For example, sidelink communication may include NR sidelink communication and V2X Sidelink communication.

NR sidelink communications (e.g., specified in 3GPP specification TS 38.311) may refer to access stratum (AS) functionality enabling at least vehicle-to-everything (V2X) communications as defined in 3GPP specification TS 23.287 between neighboring UEs, using NR technology but not traversing any network node. V2X sidelink communications (e.g., specified in 3GPP specification TS 36.311) may refer to AS functionality enabling V2X communications as defined in 3GPP specification TS 23.285 between neighboring UEs, using evolved-universal mobile telecommunication system (UMTS) terrestrial radio access (UTRA) (E-UTRA) technology, but not traversing any network node. However, if not being specified, "sidelink communications" may refer to NR sidelink communications, V2X sidelink communications, or any sidelink communications adopting other wireless communication technologies.

Referring to FIG. 1, the wireless communication system 100 may include some base stations (e.g., BS 102 and BS 103) and some UEs (e.g., UE 101A, UE 101B, and UE 101C). Although a specific number of UEs and BSs is depicted in FIG. 1, it is contemplated that any number of UEs and BSs may be included in the wireless communication system 100.

The UEs and the BSs may support communication based on, for example, 3G, long-term evolution (LTE), LTE-advanced (LTE-A), new radio (NR), or other suitable protocol(s). In some embodiments of the present disclosure, a BS (e.g., BS 102 or BS 103) may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. A UE (e.g., UE 101A, UE 101B, or UE 101C) may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

In the example of FIG. 1, the BS 102 and the BS 103 may be included in a next generation radio access network (NG-RAN). In some embodiments of the present disclosure, the BS 102 may be a gNB and the BS 103 may be an ng-eNB.

The UE 101A and UE 101B may be in-coverage (e.g., inside the NG-RAN). For example, as shown in FIG. 1, the UE 101A may be within the coverage of BS 102, and the UE 101B may be within the coverage of BS 103. The UE 101C may be out-of-coverage (e.g., outside the coverage of the NG-RAN). For example, as shown in FIG. 1, the UE 101C may be outside the coverage of any BSs, for example, both the BS 102 and BS 103. The UE 101A and UE 101B may respectively connect to the BS 102 and BS 103 via a network interface, for example, the Uu interface as specified in 3GPP standard documents. The control plane protocol stack in the Uu interface may include a radio resource control (RRC) layer, which may be referred to as a Uu RRC. The link established between a UE (e.g., UE 101A) and a BS (e.g., BS 102) may be referred to as a Uu link. The BS 102 and BS 103 may be connected to each other via a network interface, for example, the Xn interface as specified in 3GPP standard documents. The UE 101A, UE 101B, and UE 101C may be connected to each other respectively via, for example, a PC5 interface as specified in 3GPP standard documents. The control plane protocol stack in the PC5 interface may include a radio resource control (RRC) layer, which may be referred to as a PC5 RRC. The link established between two UEs (e.g., UE 101A and UE 101B) may be referred to as a PC5 link.

Support for V2X services via the PC5 interface can be provided by, for example, NR sidelink communication and/or V2X sidelink communication. NR sidelink communication can support one of the following three types of transmission modes for a pair of a source Layer-2 identity and a destination Layer-2 identity: unicast transmission, groupcast transmission, and broadcast transmission. Sidelink communication transmission and reception over the PC5 interface are supported when the UE is either in-coverage or out-of-coverage. For example, the UE 101A, which is within the coverage of the BS 102, can perform sidelink transmission and reception (e.g., sidelink unicast transmission, sidelink groupcast transmission, or sidelink broadcast transmission) over a PC5 interface. The UE 101C, which is outside the coverage of both the BS 102 and BS 103, can also perform sidelink transmission and reception over a PC5 interface.

A UE which supports sidelink communication and/or V2X communication may be referred to as a V2X UE. A V2X UE may be a cell phone, a vehicle, a roadmap device, a computer, a laptop, an IoT (internet of things) device or other type of device in accordance with some other embodiments of the present disclosure.

As mentioned above, the relaying function based on a sidelink may be supported in a communication network. In some embodiments of the present disclosure, a UE-to-network relay is supported. For example, an in-coverage UE in communication with an out-of-coverage UE may function as a relay UE between the serving BS of the in-coverage UE and the out-of-coverage UE. In some embodiments of the present disclosure, a UE-to-UE relay is supported. For example, a UE in communication with two or more UEs (e.g., first and third UEs) may function as a relay UE, such that the first UE may communicate with the third UE via the relay UE.

Figure 2:
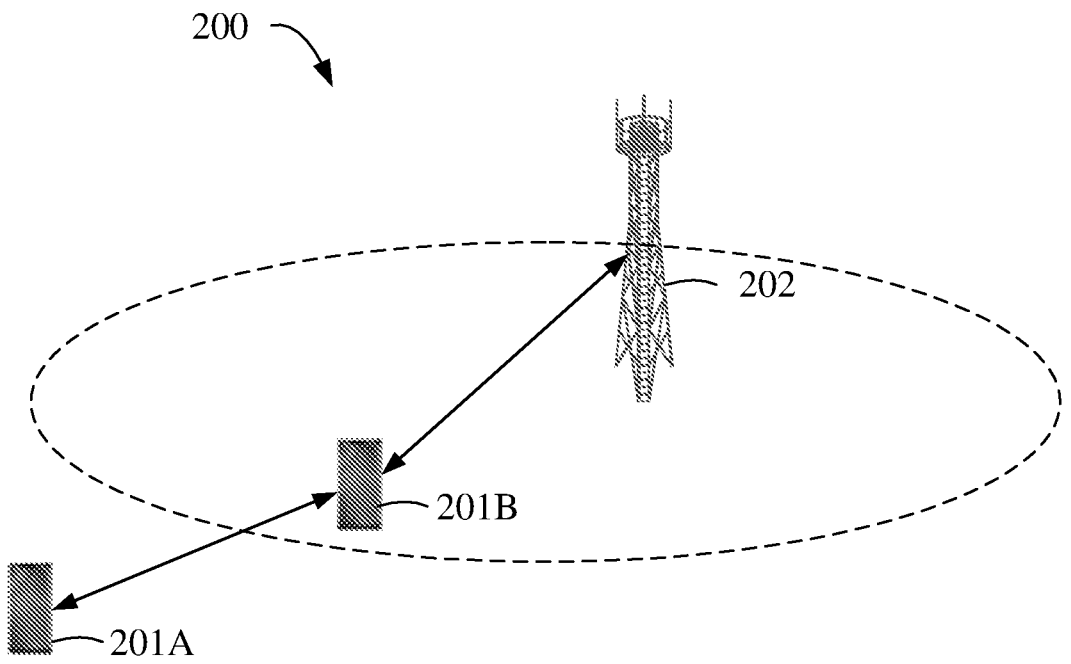
FIG. 2 illustrates a schematic diagram of a wireless communication system in accordance with some embodiments of the present disclosure.

FIG. 2 illustrates a schematic diagram of a wireless communication system 200 in accordance with some embodiments of the present disclosure.

As shown in FIG. 2, the wireless communication system 200 may include a BS (e.g., BS 202) and some UEs (e.g., UE 201A and UE 201B). Although a specific number of UEs and BS is depicted in FIG. 2, it is contemplated that any number of UEs may be included in the wireless communication system 200.

Referring to FIG. 2, UE 201B may be within the coverage of BS 202. UE 201B and BS 202 may establish an RRC connection therebetween. UE 201A may be outside of the coverage of BS 202. In some examples, UE 201B may function as UE 101A or UE 101B shown in FIG. 1, and UE 201A may function as UE 101C shown in FIG. 1.

The wireless communication system 200 may support sidelink communications. For example, UE 201B may be in sidelink communication with UE 201A. A PC5 RRC connection may be established between UE 201A and UE 201B. In some embodiments of the present disclosure, UE 201A may initiate a procedure for establishing connection with BS 202 via UE 201B (i.e., UE-to-network relay). For example, UE 201A may transmit an RRC setup request to BS 202 via UE 201B. BS 202 may transmit an RRC setup message including a response to UE 201A via UE 201B. After such procedure, UE 201A may access BS 202 (e.g., a cell of BS 202) via UE 201B. This cell is referred to as the serving cell of UE 201A. UE 201A and BS 202 may establish an RRC connection therebetween, and UE 201A may have RRC states, such as an RRC IDLE state, an RRC INACTIVE state, and an RRC CONNECTED state. UE 201A may also be referred to as a remote UE and UE 201B may also be referred to as a relay UE or a serving relay of UE 201A.

It should be appreciated by persons skilled in the art that although a single relay node between UE 201A and BS 202 is depicted in FIG. 2, it is contemplated that any number of relay nodes may be included.

Under certain circumstances, for example, when UE 201A moves from out-of-coverage to in-coverage, BS 202 (or the serving/source cell of UE 201A) may determine to switch UE 201A from the relay link to the Uu link. In some embodiments of the present disclosure, BS 202 (or the serving/source cell of UE 201A) may transmit a path switch indication, which may indicate a switch to the Uu link, to UE 201A. The path switch indication may be transmitted in an RRC reconfiguration message, which may indicate a candidate cell (e.g., the serving/source of UE 201A) for path switch (e.g., handover).

Figure 3:
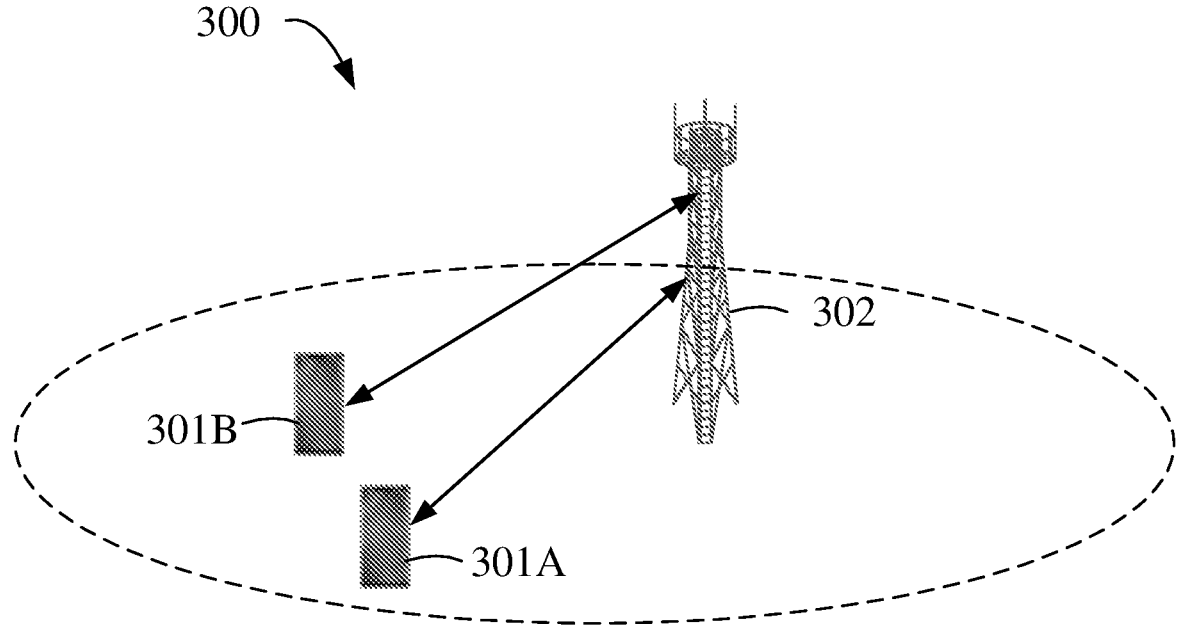
FIG. 3 illustrates a schematic diagram of a wireless communication system in accordance with some embodiments of the present disclosure.

FIG. 3 illustrates a schematic diagram of a wireless communication system 300 in accordance with some embodiments of the present disclosure.

As shown in FIG. 3, the wireless communication system 300 may include a BS (e.g., BS 302) and some UEs (e.g., UE 301A and UE 301B). Although a specific number of UEs and BS is depicted in FIG. 3, it is contemplated that any number of UEs may be included in the wireless communication system 300.

Referring to FIG. 3, UE 301A and UE 301B may be within the coverage of BS 302. Each of UE 301A and UE 301B may establish a respective RRC connection with BS 302. In some examples, UE 301A and UE 301B may function as UE 101A or UE 101B shown in FIG. 1, or UE 201B shown in FIG. 2.

Under certain circumstances, for example, when UE 301A moves to the edge of the coverage area of BS 302, BS 302 (or the serving/source cell of UE 301A) may determine to switch UE 301A from the source Uu link to a relay link. In some embodiments of the present disclosure, BS 302 may instruct 301A to establish a connection with UE 301B. For example, BS 202 (or the serving/source cell of UE 301A)

may transmit a path switch indication, which may indicate a switch to a relay node, to UE 301A. The path switch indication may be transmitted in an RRC reconfiguration message, which may indicate a candidate relay (e.g., UE 301B) for path switch (e.g., handover). UE 301A may then access BS 302 via UE 301B (for example, similar to FIG. 2 where UE 201A may access BS 202 via UE 201B).

Figure 4:
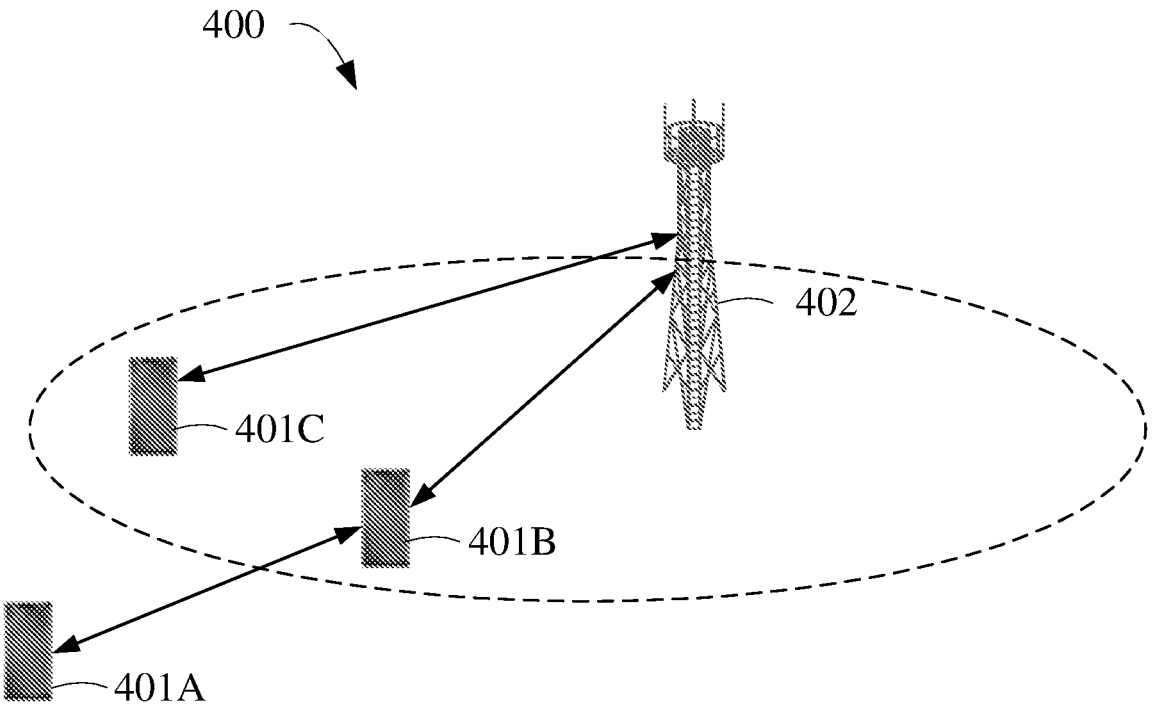
FIG. 4 illustrates a schematic diagram of a wireless communication system in accordance with some embodiments of the present disclosure.

FIG. 4 illustrates a schematic diagram of a wireless communication system 400 in accordance with some embodiments of the present disclosure.

As shown in FIG. 4, the wireless communication system 400 may include a BS (e.g., BS 402) and some UEs (e.g., UE 401A, UE 401B, and UE 401C). Although a specific number of UEs and BS is depicted in FIG. 4, it is contemplated that any number of UEs may be included in the wireless communication system 400.

Referring to FIG. 4, UE 401B and UE 401C may be within the coverage of BS 402. UE 401B and UE 401C may establish respective RRC connections with BS 402. UE 401A may be outside of the coverage of BS 402. In some examples, UE 401B and 401C may function as UE 101A or UE 101B shown in FIG. 1, or UE 201B shown in FIG. 2, or UE 301A or UE 301B in FIG. 3; and UE 401A may function as UE 101C shown in FIG. 1 or UE 201A shown in FIG. 2.

The wireless communication system 400 may support sidelink communications. For example, UE 401B may be in sidelink communication with UE 401A. A PC5 RRC connection may be established between UE 401A and UE 401B. UE 401A may access BS 402 (or a cell of BS 402) via UE 401B. UE 401A may also be referred to as a remote UE and UE 401B may also be referred to as a relay UE.

It should be appreciated by persons skilled in the art that although a single relay node between UE 401A and BS 402 is depicted in FIG. 4, it is contemplated that any number of relay nodes may be included.

Under certain circumstances, for example, when UE 401A moves away from UE 401B, but is still outside the coverage of BS 402, BS 402 (or the serving/source cell of UE 401A) may determine to switch UE 401A from the source relay link (i.e., between UE 401A and UE 401B) to a target relay link (e.g., between UE 401A and UE 401C). In some embodiments of the present disclosure, BS 402 (or the serving/source cell of UE 401A) may transmit a path switch indication, which may indicate a switch to a relay node, to UE 401A. The path switch indication may be transmitted in an RRC reconfiguration message, which may indicate a candidate relay (e.g., UE 401C) for path switch (e.g., handover). UE 401A may then access BS 402 via UE 401C (for example, similar to FIG. 2 where UE 201A may access BS 202 via UE 201B).

Figure 5:
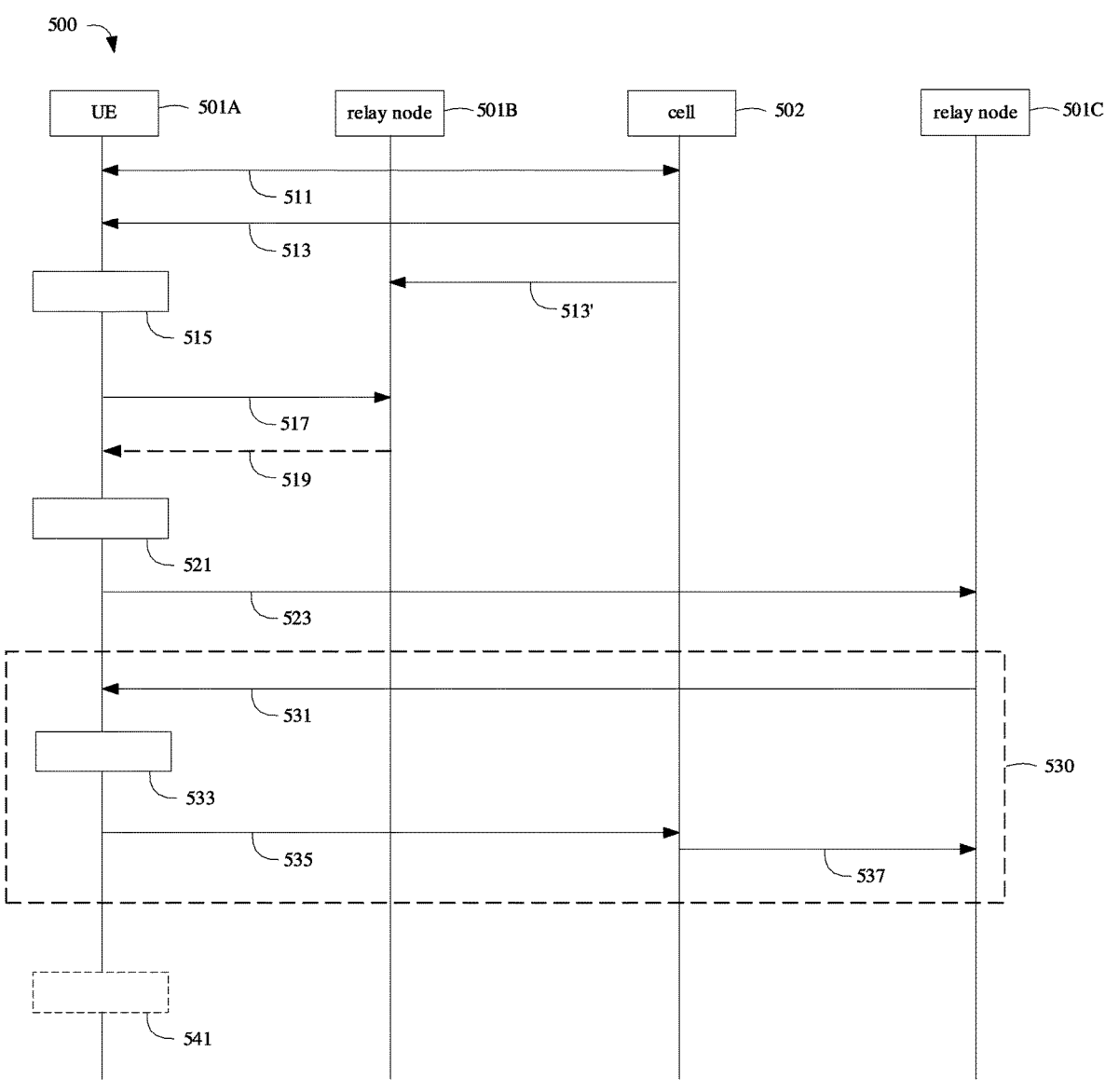
FIG. 5 illustrates an exemplary path switch procedure in accordance with some embodiments of the present disclosure.

FIG. 5 illustrates an exemplary path switch procedure 500 in accordance with some embodiments of the present disclosure. Details described in all of the foregoing embodiments of the present disclosure are applicable for the embodiments shown in FIG. 5.

Referring to FIG. 5, UE 501A is accessing cell 502 (i.e., serving cell or source cell) of a BS (also referred to as "serving BS"). In some embodiments, UE 501A may access cell 502 via a relay UE. For example, UE 501A may function as UE 201A shown in FIG. 2 or UE 401A shown in FIG. 4. In some embodiments, UE 501A may access cell 502 using a Uu interface. For example, UE 501A may function as UE 301A or 301B shown in FIG. 3.

In operation 511, UE 501A may be configured with a measurement configuration by cell 502. UE 501A may report corresponding measurement results to cell 502.

In some embodiments of the present disclosure, UE 501A may report at least one candidate relay UE based on the measurement configuration. In some examples, UE 501A may report the candidate relay UE(s) after UE 501A measures and/or discovers the candidate relay UE(s). In some examples, the report may indicate at least one of: an identity (ID) of the at least one candidate relay UE, sidelink channel quality (e.g., reference signal received power (RSRP)) information between UE 501A and the at least one candidate relay UE. For example, UE 501A may report the ID of a candidate relay UE #A, and/or the sidelink channel quality information between UE 501A and the candidate relay UE #A.

In some examples, the candidate relay UE ID may be a layer-2 ID, a cell radio network temporary identifier (C-RNTI), or a UE ID indicated in a discovery message. For instance, during a UE discovery procedure, UE 501A may receive a discovery message from another UE, which may include an ID of the another UE. UE 501A may report such UE ID in the discovery message to cell 502.

In response to the measurement report from UE 501A, cell 502 (or the serving BS of UE 501A) may determine to switch UE 501A to a relay node. In operation 513, cell 502 (or the serving BS) may transmit an RRC reconfiguration message including a path switch indication and a list of candidate relays to UE 501A. The list of candidate relays may include one or more candidate relays (e.g., relay node 501B). In some embodiments of the present disclosure, the path switch indication may be indicated by a reconfiguration with sync information element (IE) in the RRC reconfiguration message. UE 501A may or may not detach the source link in response to the RRC reconfiguration message including the path switch indication.

In some embodiments of the present disclosure, the list of candidate relays may include one or more candidate relays. In some embodiments of the present disclosure, the candidate relays in the list of candidate relays may be arranged based on priorities. For example, the first candidate relay in the list of candidate relays may have the highest priority to access during a path switch.

In some embodiments of the present disclosure, cell 502 (or the serving BS of UE 501A) may transmit an RRC reconfiguration message including a parameter(s) associated with UE 501A to the candidate relays. For example, in operation 513', cell 502 may transmit an RRC reconfiguration message including a parameter(s) associated with UE 501A to relay node 501B.

In some embodiments of the present disclosure, a consecutive path switch may be configured. For example, the RRC reconfiguration message transmitted to UE 501A in operation 513 may include an indication of whether the consecutive path switch is allowed (or supported) or not. In the case that a consecutive path switch is allowed, the RRC reconfiguration message may further indicate a maximum number of consecutive path switch or a value of a timer for consecutive path switch.

In some examples, the RRC reconfiguration message may not include the above indication. UE 501A may implicitly determine whether the consecutive path switch is allowed or not. For instance, when a maximum number of consecutive path switch or a value of a timer for consecutive path switch is indicated in the RRC reconfiguration message, UE 501A may determine that the consecutive path switch is allowed. Otherwise, when neither a maximum number of consecutive path switch nor a value of a timer for consecutive path switch is indicated in the RRC reconfiguration message, UE 501A may determine that the consecutive path switch is not allowed.

When the maximum number of consecutive path switch is configured, UE 501A may initiate a counter for consecutive path switch in response to receiving the RRC reconfiguration message. For example, UE 501A may set the counter for consecutive path switch to an initial value (e.g., 0) in response to receiving the RRC reconfiguration message. Each time when UE 501A initiates or performs a path switch procedure with a corresponding target node, UE 501A may increment the counter for consecutive path switch by a value (e.g., 1).

When the value of the timer for consecutive path switch is configured, UE 501A may start the timer for consecutive path switch in response to receiving the RRC reconfiguration message, or the initiation or performance of the path switch procedure with a first target node (e.g., relay node 501B in FIG. 5).

Still referring to FIG. 5, in operation 515, in response to receiving the RRC reconfiguration message including the path switch indication, UE 501A may initiate a path switch procedure and start a mobility timer (e.g., T304 as specified in 3GPP specifications).

In some embodiments of the present disclosure, UE 501A may also start the timer for consecutive path switch (if configured) in response to receiving the RRC reconfiguration message including the path switch indication.

In some embodiments of the present disclosure, when a consecutive path switch is allowed, it is possible that UE 501A may need to perform more than one path switch procedures before successfully accessing a final target node. The mobility timer started in response to the initiation of each path switch procedure may only be associated with the target node (either a relay or a cell) in the corresponding path switch procedure.

In some embodiments of the present disclosure, UE 501A may select a target relay (e.g., relay node 501B) from the list of candidate relays. The following criteria as well as other criteria may be used, alone or in any combination, during the selection of a target node for a path switch.

In some examples, UE 501A may select the target relay from the list of candidate relays based on a priority. For instance, the first candidate relay in the list of candidate relays may have the highest priority and UE 501A may select the first candidate relay as a target relay.

In some examples, UE 501A may select a candidate relay from the list of candidate relays based on the channel quality information, for example, in response to the channel quality between the candidate relay and UE 501A being equal to or greater than a threshold (which can be configured or predefined). In some examples, UE 501A may select a candidate relay having a best channel quality among the channel quality information between the candidate relays in the list of candidate relays and UE 501A.

In some examples, UE 501A may select a candidate relay from the list of candidate relays in priority in response to a PC5 connection being established between the UE and the candidate relay.

After selecting the target node (e.g., relay node 501B), UE 501A may perform a path switch procedure with the target node. For example, UE 501A may initiate a sidelink RRC reconfiguration procedure, and may, in operation 517, transmit an RRC reconfiguration sidelink message to relay node 501B to establish a PC5 link with relay node 501B in response to discovering relay node 501B. UE 501A may start a sidelink reconfiguration timer (e.g., T400 as specified in 3GPP specifications) in response to the transmission of the RRC reconfiguration sidelink message. When the maximum number of consecutive path switch is configured, since it is the first time UE 501A tried to access a target node, the value of the counter for consecutive path switch may be set as 1 (i.e., increased from the initial value 0 to 1).

In the case that UE 501A has not discovered relay node 501B, a UE discovery procedure may be performed between UE 501A and relay node 501B before the transmission of the RRC reconfiguration sidelink message. For example, UE 501A may transmit a discovery message to relay node 501B. The discovery message may indicate the ID of relay node 501B configured by cell 502. Relay node 501B may transmit a response message to UE 501A.

In some embodiments of the present disclosure, relay node 501B may transmit an RRC reconfiguration complete sidelink message to UE 501A. In response to receiving the RRC reconfiguration complete sidelink message, UE 501A may consider that the path switch to relay node 501B is successful. UE 501A may stop at least one of the sidelink reconfiguration timer and the mobility timer in response to the RRC reconfiguration complete sidelink message.

In some embodiments of the present disclosure, UE 501A may receive an RRC reconfiguration failure sidelink message from relay node 501B in operation 519 (denoted by dotted line as an option). UE 501A may stop the mobility timer, the sidelink reconfiguration timer, or both in response to the reception of the RRC reconfiguration failure sidelink message.

In some embodiments of the present disclosure, the sidelink reconfiguration timer may expire before receiving any message from relay node 501B. In some examples, UE 501A may stop the mobility timer in response to the expiry of the sidelink reconfiguration timer. In some embodiments of the present disclosure, UE 501A may not stop the mobility timer in response to the reception of the RRC reconfiguration failure sidelink message or the expiry of the sidelink reconfiguration timer.

In response to the reception of the RRC reconfiguration failure sidelink message, or the expiry of the sidelink reconfiguration timer, or the expiry of the mobility timer, UE 501A may consider that the path switch to relay node 501B fails. When the consecutive path switch is not allowed, UE 501A may initiate a reestablishment procedure, for example, over the Uu interface (in the case that the source link is detached). For example, UE 501A may select a suitable cell or candidate relay and may access the selected cell or relay based on the reestablishment procedure. In some embodiments of the present disclosure, UE 501A may fall back to the source link in the case that the source link is not detached.

When the consecutive path switch is allowed, UE 501A may perform another path switch procedure. For example, in operation 521, UE 501A may select another target relay (e.g., relay node 501C) from the list of candidate relays based on at least one of the criteria as mentioned above. For instance, UE 501A may select a candidate relay having the second highest priority as a target relay.

In operation 523, UE 501A may transmit an RRC reconfiguration sidelink message to relay node 501C to establish a PC5 link with relay node 501C. UE 501A may start a sidelink reconfiguration timer (e.g., T400 as specified in 3GPP specifications) in response to the transmission of the RRC reconfiguration sidelink message. In the case that UE 501A has not discovered relay node 501C, a UE discovery procedure may be performed between UE 501A and relay node 501C before the transmission of the RRC reconfiguration sidelink message.

UE 501A may increment the counter for consecutive path switch by a value (e.g., 1) in response to the transmission of the RRC reconfiguration sidelink message. Since it is the second time UE 501A tried to access a target node, the value of the counter for consecutive path switch may be set as 2 (i.e., increased from 1 to 2).

In some embodiments of the present disclosure, the second path switch procedure may succeed according to procedure 530 (denoted by dotted block as an option).

For example, in operation 531 of procedure 530, UE 501A may receive an RRC reconfiguration complete sidelink message from relay node 501C. In response to the RRC reconfiguration complete sidelink message, UE 501A may, in operation 533, stop the timer for consecutive path switch, the sidelink reconfiguration timer and the mobility timer, if configured. UE 501A may reset the counter for consecutive path switch, if configured.

In operation 535, UE 501A may transmit an RRC reconfiguration complete message to cell 502 via relay node 501C. The RRC reconfiguration complete message may be transmitted based on the configuration provided in the RRC reconfiguration message (e.g., in operation 513 shown in FIG. 5). In some embodiments of the present disclosure, UE 501A may report the failed candidate relay node(s). For example, the RRC reconfiguration complete message may indicate an ID of relay node 501B.

In some embodiments of the present disclosure, the consecutive path switch procedure may fail. For example, in operation 541 (denoted by dotted block as an option), in response to the value of the counter for consecutive path switch being equal to or greater than the maximum number of consecutive path switch or the expiry of the timer for consecutive path switch, UE 501A may initiate a reestablishment procedure. For example, UE 501A may select a suitable cell or candidate relay and may access the selected cell or relay based on the reestablishment procedure. In some embodiments of the present disclosure, UE 501A may fall back to the source link in the case that the source link is not detached.

It should be appreciated by persons skilled in the art that the sequence of the operations in exemplary procedures 500 and 530 may be changed and some of the operations in exemplary procedures 500 and 530 may be eliminated or modified, without departing from the spirit and scope of the disclosure.

Figure 6:
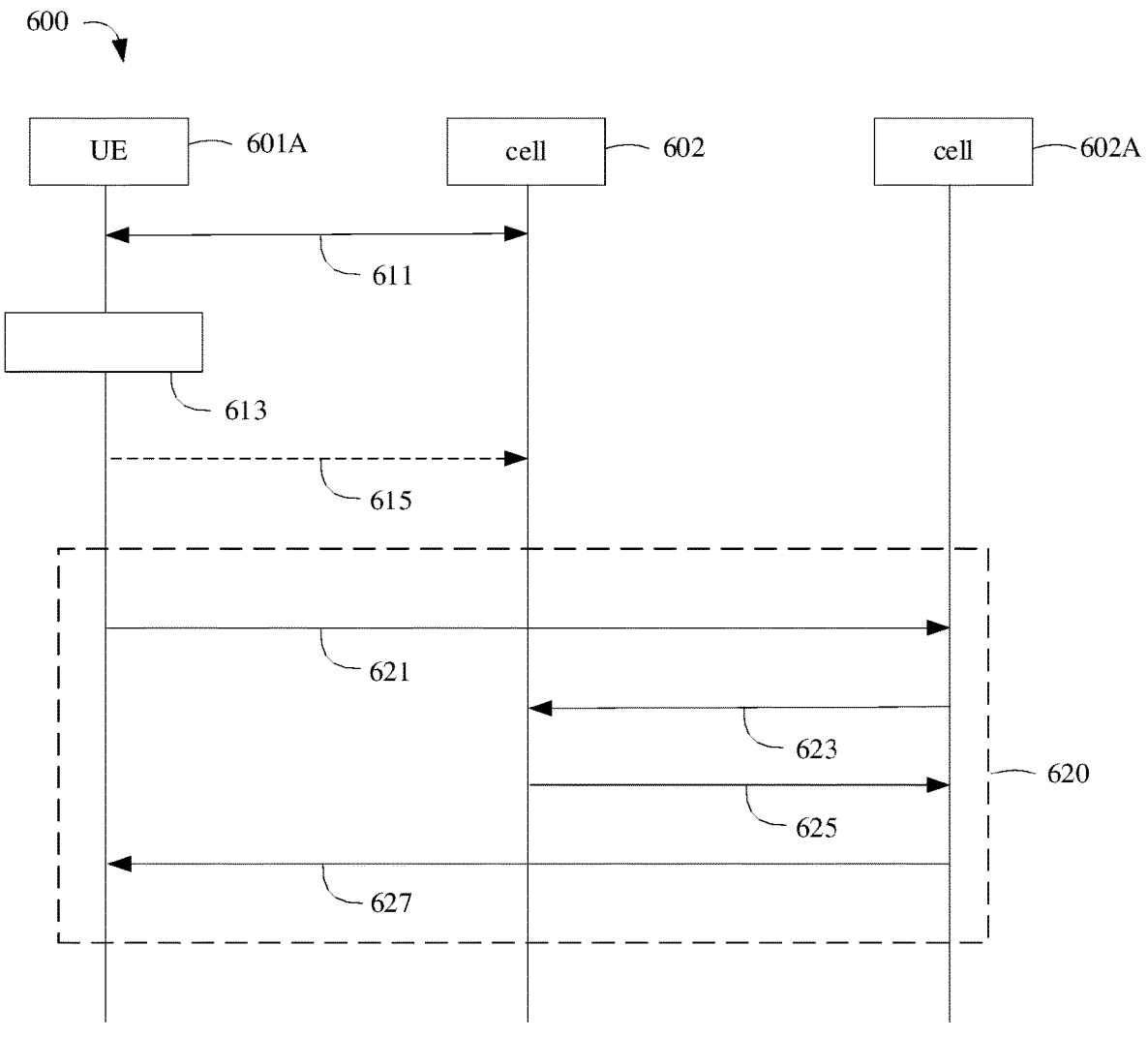
FIG. 6 illustrates an exemplary reestablishment procedure in accordance with some embodiments of the present disclosure.

FIG. 6 illustrates an exemplary path switch procedure 600 in accordance with some embodiments of the present disclosure. Details described in all of the foregoing embodiments of the present disclosure are applicable for the embodiments shown in FIG. 6.

Referring to FIG. 6, in operation 611, UE 601A is accessing cell 602 (i.e., serving cell or source cell) of a BS (also referred to as "serving BS" or "source BS"). In some embodiments, UE 601A may access cell 602 via a relay UE. For example, UE 601A may function as UE 201A shown in FIG. 2 or UE 401A shown in FIG. 4. In some embodiments, UE 601A may access cell 602 using a Uu interface. For example, UE 601A may function as UE 301A or 301B shown in FIG. 3.

In some embodiments of the present disclosure, cell 602 may transmit, to UE 601A, an indication indicating whether a candidate relay is allowable for reestablishment. That is, whether UE 601A can select a candidate relay for reestablishment. Such indication (hereinafter, "indication #1") may be transmitted via an RRC reconfiguration message.

At a certain time, a handover failure may occur in operation 613. For example, as described with respect to FIG. 5, UE 601A may fail to perform a successful path switch procedure in response to a path switch indication from cell 602. Alternatively, a radio link failure (RLF) may occur in operation 613. For example, in the case of UE 601A accessing cell 602 via a relay UE, an RLF may occur on the source PC5 link between UE 601A and the relay UE (e.g., relay UE #B). In the case of UE 601A accessing cell 602 using a Uu interface, an RLF may occur on the source Uu link between UE 601A and cell 602.

In response to the handover failure or RLF, UE 601A may initiating a reestablishment procedure. UE 601A may select a target node from a plurality of candidate nodes for reestablishment in response to the handover failure or the radio link failure. The plurality of candidate nodes may include at least one candidate cell, and at least one candidate relay, or both. The target node may be either a candidate cell or a candidate relay.

In some embodiments of the present disclosure, UE 601A may select the target node from the plurality of candidate nodes based on certain criteria.

For example, UE 601A may determine whether it is allowable to select a candidate relay for reestablishment based on indication #1. In some other examples, the candidate relay may be allowable for reestablishment by default. That is, indication #1 may not be transmitted and UE 601A may determine that it is allowable to select a candidate relay for reestablishment.

For example, UE 601A may select the target node from the plurality of candidate nodes based on a priority. The priorities of the candidate nodes may be configured by a BS (e.g., source BS or cell 602) or may be predefined, for example, in standard(s). In some examples, the source cell (i.e., cell 602) of UE 601A and a candidate relay(s) served by the source cell may have a first priority, and a neighbor cell (e.g., cell 602A) different from the source cell of UE 601A and a candidate relay(s) served by the neighbor cell may have a second priority lower than the first priority.

In some embodiments of the present disclosure, UE 601A may select the source cell (i.e., cell 602) or a candidate relay served by the source cell as the target node.

In the case that UE 601A selects a candidate relay (e.g., relay UE #C) served by the source cell as the target node, UE 601A may initiate a sidelink RRC reconfiguration procedure similar to the one described above. For example, UE 601A may transmit an RRC reconfiguration sidelink message to the target relay node to establish a PC5 link in response to discovering the target relay node. In some embodiments of the present disclosure, when UE 601A fails to receive an RRC reconfiguration complete sidelink message before the expiry of the sidelink reconfiguration timer, UE 601A may be allowed to select another target node (candidate cell or another candidate relay) for reestablishment. In the case that UE 601A selects the source cell (i.e., cell 602), UE 601A may perform a random access procedure (RAP) according to one of the known RAPs in the art.

In operation 615 (denoted by dotted line as an option), UE 601A may transmit an RRC message to cell 602. The RRC message may be transmitted via a relay node (e.g., relay UE #C) to cell 602 or via the Uu interface between UE 601A and cell 602. The RRC message may be a UE assistant information message or other RRC message.

In some embodiments of the present disclosure, the RRC message may include at least one of: an ID of a relay node (e.g., relay UE #B) in response to the RLF on a PC5 link between UE 601A and the relay node (e.g., relay UE #B), and a failure cause indicating the type of a failure at UE 601A (e.g., a failure cause associated with the handover failure or the RLF). For example, the failure cause may indicate a handover failure, an RLF, a reconfiguration failure, or an expiry of a keep-alive timer.

The keep-alive timer refers to a timer employed in a keep-alive procedure in PC5-S layers of two peer UEs (e.g., UE 201A and UE 201B in FIG. 2) communicating over the PC5 interface. The keep-alive procedure is used to detect whether a particular PC5 link (e.g., PC5 unicast link) is still valid. The UEs shall minimize the keep-alive signaling, for example, cancel the procedure, if data is successfully received over the PC5 link.

In some embodiments of the present disclosure, the keep-alive procedure may be performed as follows. Referring back to FIG. 2, UE 201A and UE 201B may have established a PC5 link therebetween. UE 201A may transmit a keep-alive message to UE 201B to determine the status of the PC5 link based on a trigger condition. In response to the keep-alive message, UE 201A may start a keep-alive timer. In response to receiving the keep-alive message, UE 201B may respond with a keep-alive ACK message. UE 201A may stop the keep-alive timer in response to receiving a response (e.g., the keep-alive ACK message) from UE 201B. Otherwise, the keep-alive timer may expire.

Referring to FIG. 6, in the case that UE 601A accesses cell 602 via a relay node (e.g., relay UE #C), cell 602 (or the corresponding BS) may transmit an RRC reconfiguration message to relay UE #C (not shown in FIG. 6). The RRC reconfiguration message may include corresponding configuration associated with UE 601A (e.g., bearer mapping configuration).

In some embodiments of the present disclosure, UE 601A may select a cell (e.g., a neighbor cell such as cell 602A) different from the source cell or a candidate relay (e.g., relay UE #D not shown in FIG. 6) served by the different cell as the target node. For example, UE 501A may establish a connection with the target node according to procedure 620 (denoted by dotted block as an option).

According to procedure 620, in operation 621, UE 601A may transmit an RRC reestablishment request message to cell 602A. The RRC reestablishment request message may be transmitted via a relay node (e.g., relay UE #D) to cell 602A or according to a RAP with cell 602A.

In some embodiments of the present disclosure, the RRC reestablishment request message may include at least one of: an ID of a relay node (e.g., relay UE #B) in response to the RLF on a PC5 link between UE 601A and the relay node (e.g., relay UE #B), a failure cause indicating the type of a failure at UE 601A (e.g., a failure cause associated with the handover failure or the RLF), and an ID of a source cell (i.e., cell 602) of UE 601A. For example, the failure cause may indicate a handover failure, an RLF, a reconfiguration failure, or an expiry of a keep-alive timer.

In operation 623, cell 602A may transmit a UE context request to cell 602. In operation 625, cell 602 may transmit the UE context of UE 601A to cell 602A. In operation 627, cell 602A may transmit an RRC establishment message to UE 601A in response to receiving the UE context from cell 602.

It should be appreciated by persons skilled in the art that the sequence of the operations in exemplary procedures 600 and 620 may be changed and some of the operations in exemplary procedures 600 and 620 may be eliminated or modified, without departing from the spirit and scope of the disclosure.

Figure 7:
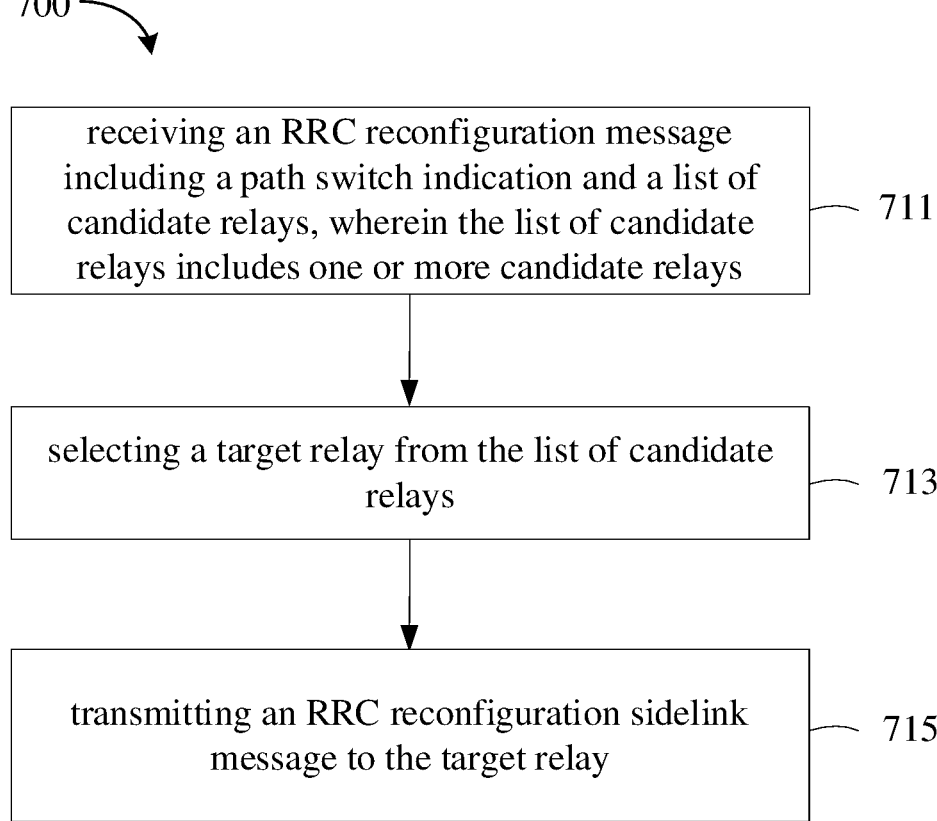
FIG. 7 illustrates a flow chart of an exemplary procedure of wireless communications in accordance with some embodiments of the present disclosure.

FIG. 7 illustrates an exemplary path switch procedure 700 in accordance with some embodiments of the present disclosure. Details described in all of the foregoing embodiments of the present disclosure are applicable for the embodiments shown in FIG. 7. In some examples, the procedure may be performed by a UE, for example, UE 501A in FIG. 5.

Referring to FIG. 7, a UE may is accessing a cell (e.g., serving cell). In some examples, the UE may access the serving cell via a relay UE. In some examples, the UE may access the serving cell using a Uu interface.

In operation 711, the UE may receive an RRC reconfiguration message including a path switch indication and a list of candidate relays. The list of candidate relays may include one or more candidate relays. In some embodiments of the present disclosure, in response to receiving the RRC reconfiguration message, the UE may start a mobility timer.

In operation 713, the UE may select a target relay from the list of candidate relays. The selection may be based on certain criteria as described above.

For example, selecting the target relay from the list of candidate relays may include at least one of the following: selecting the first candidate relay in the list of candidate relays as the target relay; selecting a candidate relay from the list of candidate relays in response to the channel quality between the candidate relay and the UE being equal to or greater than a threshold; and selecting a candidate relay from the list of candidate relays in response to a PC5 connection being established between the UE and the candidate relay.

In operation 715, the UE may transmit an RRC reconfiguration sidelink message to the target relay. In some embodiments of the present disclosure, in response to transmitting the RRC reconfiguration sidelink message, the UE may start a sidelink reconfiguration timer.

In some embodiments of the present disclosure, the UE may receive an RRC reconfiguration complete sidelink message in response to the RRC reconfiguration sidelink message. The UE may stop the mobility timer and the sidelink reconfiguration timer, if configured, in response to receiving an RRC reconfiguration complete sidelink message.

In some embodiments of the present disclosure, the UE may initiate a reestablishment procedure in response to receiving an RRC reconfiguration failure sidelink message, an expiry of the mobility timer, or an expiry of the sidelink reconfiguration timer.

In some embodiments of the present disclosure, a consecutive path switch as described above may be allowed. For example, the RRC reconfiguration message may indicate at least one of: an indication of whether a consecutive path switch is allowed or not; a maximum number of consecutive path switch; and a value of a timer for consecutive path switch.

In some embodiments of the present disclosure, when the maximum number of consecutive path switch is indicated in the RRC reconfiguration message, the UE may set a counter for consecutive path switch to an initial value (e.g., 0) in response to receiving the RRC reconfiguration message. When the value of the timer for consecutive path switch is indicated in the RRC reconfiguration message, the UE may start the timer for consecutive path switch in response to receiving the RRC reconfiguration message.

In response to a failure to connect to the target relay, the UE may select a second target relay from the list of candidate relays, transmit a second RRC reconfiguration sidelink message to the second target relay, and increment the counter for consecutive path switch by a value (e.g., 1), if configured.

In response to receiving an RRC reconfiguration complete sidelink message from the second target relay, the UE may stop the timer for consecutive path switch or reset the counter for consecutive path switch. The UE may transmit an RRC reconfiguration complete message indicating an ID of the target relay.

In response to the value of the counter for consecutive path switch being equal to or greater than the maximum number of consecutive path switch or the expiry of the timer for consecutive path switch, The UE may initiate a reestablishment procedure.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
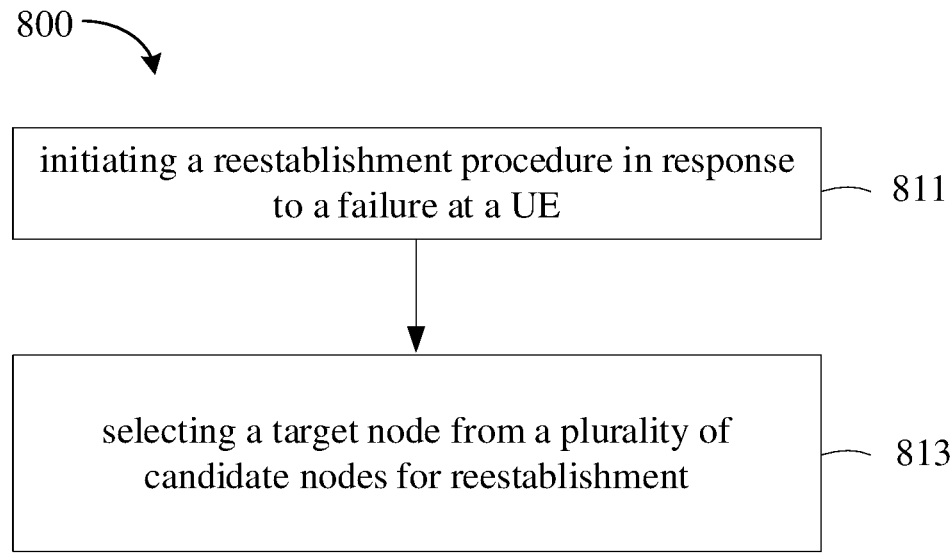
FIG. 8 illustrates a flow chart of an exemplary procedure of wireless communications in accordance with some embodiments of the present disclosure.

FIG. 8 illustrates an exemplary path switch procedure 800 in accordance with some embodiments of the present disclosure. Details described in all of the foregoing embodiments of the present disclosure are applicable for the embodiments shown in FIG. 8. In some examples, the procedure may be performed by a UE, for example, UE 601A in FIG. 6.

Referring to FIG. 8, a failure may occur at a UE. For example, a serving cell (or source cell) of the UE may transmit a path switch indication to the UE, which may fail to perform a successful path switch procedure. Thus, a handover failure may occur at the UE. For example, the UE may access a cell (serving cell or source cell) via a relay UE, an RLF may occur on the PC5 link between the UE and the relay UE. For example, the UE may access a cell (serving cell or source cell) using a Uu interface, an RLF may occur on the Uu link between the UE and the cell.

In operation 811, the UE may initiate a reestablishment procedure in response to a failure at the UE, for example, a handover failure or a radio link failure.

In operation 813, the UE may select a target node from a plurality of candidate nodes for reestablishment. The target node may be either a candidate cell or a candidate relay.

In some embodiments of the present disclosure, the UE may receive, from the source cell, an RRC reconfiguration message indicating that a candidate relay is allowable for reestablishment (e.g., indication #1 as described above). In some embodiments of the present disclosure, the candidate relay may be allowable for reestablishment by default.

In some embodiments of the present disclosure, the UE may select a target node based on certain criteria as described above. For example, the UE may select the target node from the plurality of candidate nodes based on a priority. In some embodiments of the present disclosure, the source cell of the UE and a candidate relay served by the source cell may have a priority (hereinafter, "first priority"). The cell (e.g., a neighbor cell) different from the source cell and a candidate relay served by the neighbor cell may have another priority lower than the first priority. In some embodiments of the present disclosure, the priorities of the plurality of candidate nodes may be configured by a cell (e.g., source cell of the UE) or predefined (e.g., in standard(s)).

In some embodiments of the present disclosure, in response to the target node being the source cell of the UE or a candidate relay served by the source cell, the UE may transmit an RRC message to the target node. The RRC message may include at least one of: an ID of a relay node in response to a failure on a PC5 link between the UE and the relay node; and a failure cause associated with the handover failure or the radio link failure. The RRC message may be a UE assistant information message or other RRC message.

In some embodiments of the present disclosure, in response to the target node being a neighbor cell or a candidate relay served by the neighbor cell, the UE may transmit an RRC reestablishment request message to the target node. The RRC reestablishment request message may include at least one of: an ID of a relay node in response to a failure on a PC5 link between the UE and the relay node; a failure cause associated with the handover failure or the radio link failure; and an ID of the source cell of the UE.

Descriptions of the failure cause as described above with respect to FIG. 6 may apply here. For example, the failure cause may be selected from a group including a handover failure, a radio link failure, a reconfiguration failure, and an expiry of a keep-alive timer.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
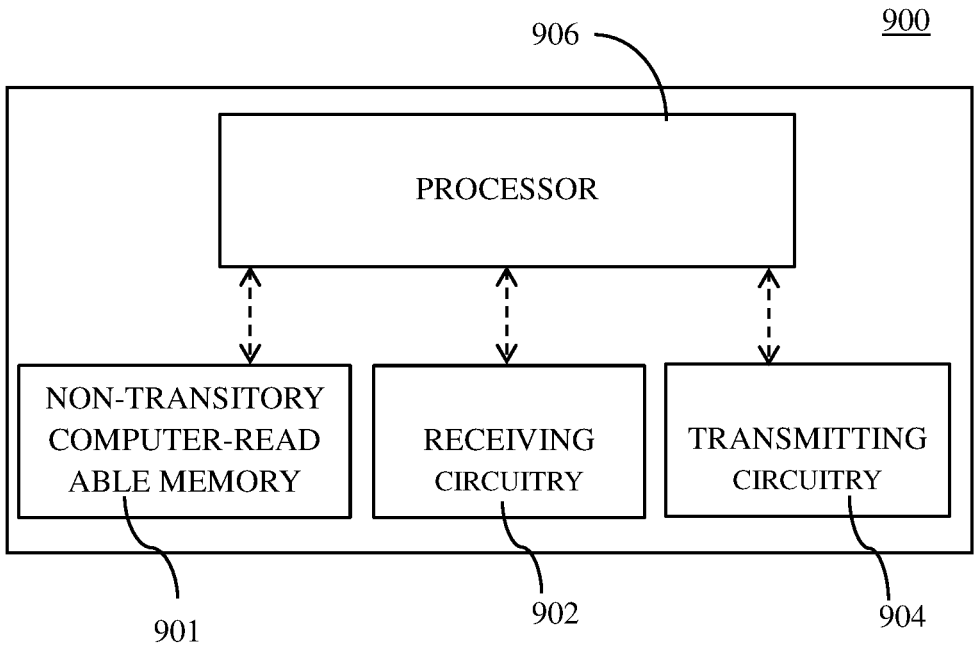
FIG. 9 illustrates a block diagram of an exemplary apparatus in accordance with some embodiments of the present disclosure.

FIG. 9 illustrates a block diagram of an exemplary apparatus 900 according to some embodiments of the present disclosure.

As shown in FIG. 9, the apparatus 900 may include at least one non-transitory computer-readable medium 901, at least one receiving circuitry 902, at least one transmitting circuitry 904, and at least one processor 906 coupled to the non-transitory computer-readable medium 901, the receiving circuitry 902 and the transmitting circuitry 904. The apparatus 900 may be a base station side apparatus (e.g., a BS) or a communication device (e.g., a UE).

Although in this figure, elements such as the at least one processor 906, transmitting circuitry 904, and receiving circuitry 902 are described in the singular, the plural is contemplated unless a limitation to the singular is explicitly stated. In some embodiments of the present application, the receiving circuitry 902 and the transmitting circuitry 904 are combined into a single device, such as a transceiver. In certain embodiments of the present application, the apparatus 900 may further include an input device, a memory, and/or other components.

In some embodiments of the present disclosure, the non-transitory computer-readable medium 901 may have stored thereon computer-executable instructions to cause a processor to implement the method with respect to the UEs as described above. For example, the computer-executable instructions, when executed, cause the processor 906 interacting with receiving circuitry 902 and transmitting circuitry 904, so as to perform the operations with respect to the UEs described in FIGS. 1-8.

In some embodiments of the present disclosure, the non-transitory computer-readable medium 901 may have stored thereon computer-executable instructions to cause a processor to implement the method with respect to the BSs as described above. For example, the computer-executable instructions, when executed, cause the processor 906 interacting with receiving circuitry 902 and transmitting circuitry 904, so as to perform the operations with respect to the BSs or cells described in FIGS. 1-8.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A user equipment (UE) for wireless communication, comprising:

at least one memory;

at least one processor coupled with the at least one memory and configured to:

receive a radio resource control (RRC) reconfiguration message including a path switch indication and a list of candidate relays, wherein the list of candidate relays includes one or more candidate relays, and wherein the RRC reconfiguration message includes:

an indication of whether a consecutive path switch is allowed or not, a maximum number of consecutive path switches, or a value of a timer for the consecutive path switch;

select a target relay from the list of candidate relays; and transmit an RRC reconfiguration sidelink message to the target relay.

2. The UE of claim 1, wherein the UE selects the target relay from the list of candidate relays by:

selecting the first candidate relay in the list of candidate relays as the target relay;

selecting a candidate relay from the list of candidate relays in response to the channel quality between the candidate relay and the UE being equal to or greater than a threshold; or selecting a candidate relay from the list of candidate relays in response to a PC5 connection being established between the UE and the candidate relay.

3. The UE of claim 1, wherein the at least one processor is further configured to cause the UE to:

set a counter for consecutive path switch to an initial value in response to receiving the RRC reconfiguration message when the maximum number of consecutive path switches is indicated in the RRC reconfiguration message; or start the timer for the consecutive path switch in response to receiving the RRC reconfiguration message when the value of the timer for the consecutive path switch is indicated in the RRC reconfiguration message.

4. The UE of claim 3, wherein the at least one processor is further configured to, in response to a failure to connect to the target relay, cause the UE to:

select a second target relay from the list of candidate relays;

transmit a second RRC reconfiguration sidelink message to the second target relay; and increment the counter for the consecutive path switch by a value.

5. The UE of claim 4, wherein the at least one processor is further configured to, in response to receiving an RRC reconfiguration complete sidelink message from the second target relay, cause the UE to:

stop the timer for the consecutive path switch or reset the counter for the consecutive path switch; and transmit an RRC reconfiguration complete message, wherein the RRC reconfiguration complete message indicates an ID of the target relay.

6. The UE of claim 4, wherein the at least one processor is further configured to cause the UE to:

in response to the value of the counter for the consecutive path switch being equal to or greater than the maximum number of the consecutive path switch or the expiry of the timer for the consecutive path switch, initiate a reestablishment procedure.

7. The UE of claim 1, wherein the at least one processor is further configured to cause the UE to:

start a mobility timer in response to receiving the RRC reconfiguration message;

start a sidelink reconfiguration timer in response to transmitting the RRC reconfiguration sidelink message; and stop the mobility timer and the sidelink reconfiguration timer in response to receiving an RRC reconfiguration complete sidelink message.

8. A processor for wireless communication, the processor comprising:

at least one memory;

a controller coupled with the at least one memory and configured to cause the processor to:

receive a radio resource control (RRC) reconfiguration message including a path switch indication and a list of candidate relays, wherein the list of candidate relays includes one or more candidate relays, and wherein the RRC reconfiguration message includes:

an indication of whether a consecutive path switch is allowed or not, a maximum number of consecutive path switches, or a value of a timer for the consecutive path switch;

select a target relay from the list of candidate relays; and transmit an RRC reconfiguration sidelink message to the target relay.

9. The processor of claim 8, wherein the processor selects the target relay from the list of candidate relays by:

selecting the first candidate relay in the list of candidate relays as the target relay;

selecting a candidate relay from the list of candidate relays in response to the channel quality between the candidate relay and the processor being equal to or greater than a threshold; or selecting a candidate relay from the list of candidate relays in response to a PC5 connection being established between the processor and the candidate relay.

10. A method performed by a user equipment (UE), the method comprising:

receiving a radio resource control (RRC) reconfiguration message including a path switch indication and a list of candidate relays, wherein the list of candidate relays includes one or more candidate relays, and wherein the RRC reconfiguration message includes:

an indication of whether a consecutive path switch is allowed or not, a maximum number of consecutive path switches, or a value of a timer for the consecutive path switch;

selecting a target relay from the list of candidate relays; and transmitting an RRC reconfiguration sidelink message to the target relay.

11. The method of claim 10, wherein selecting the target relay from the list of candidate relays includes:

selecting the first candidate relay in the list of candidate relays as the target relay;

selecting a candidate relay from the list of candidate relays in response to the channel quality between the candidate relay and the UE being equal to or greater than a threshold; or selecting a candidate relay from the list of candidate relays in response to a PC5 connection being established between the UE and the candidate relay.

12. The method of claim 10, further comprising:

setting a counter for consecutive path switch to an initial value in response to receiving the RRC reconfiguration message when the maximum number of consecutive path switches is indicated in the RRC reconfiguration message; or starting the timer for the consecutive path switch in response to receiving the RRC reconfiguration message when the value of the timer for the consecutive path switch is indicated in the RRC reconfiguration message.

13. The method of claim 12, further comprising:

selecting a second target relay from the list of candidate relays;

transmitting a second RRC reconfiguration sidelink message to the second target relay; and incrementing the counter for the consecutive path switch by a value.

14. The method of claim 13, further comprising:

in response to receiving an RRC reconfiguration complete sidelink message from the second target relay, stopping the timer for the consecutive path switch or resetting the counter for the consecutive path switch; and transmitting an RRC reconfiguration complete message, wherein the RRC reconfiguration complete message indicates an ID of the target relay.

15. The method of claim 13, further comprising:

in response to the value of the counter for the consecutive path switch being equal to or greater than the maximum number of the consecutive path switch or the expiry of the timer for the consecutive path switch, initiating a reestablishment procedure.

16. The method of claim 10, further comprising:

starting a mobility timer in response to receiving the RRC reconfiguration message;

starting a sidelink reconfiguration timer in response to transmitting the RRC reconfiguration sidelink message; and stopping the mobility timer and the sidelink reconfiguration timer in response to receiving an RRC reconfiguration complete sidelink message.

17. A user equipment (UE) for wireless communication, comprising:

at least one memory;

at least one processor coupled with the at least one memory and configured to:

receive a radio resource control (RRC) reconfiguration message including a path switch indication and a list of candidate relays, wherein the list of candidate relays includes one or more candidate relays;

select a target relay from the list of candidate relays;

transmit an RRC reconfiguration sidelink message to the target relay;

start a mobility timer in response to receiving the RRC reconfiguration message;

start a sidelink reconfiguration timer in response to transmitting the RRC reconfiguration sidelink message; and stop the mobility timer and the sidelink reconfiguration timer in response to receiving an RRC reconfiguration complete sidelink message.

\* \* \* \* \*